(No Model.) 6 Sheets—Sheet 1.
J. R. CARTER.
NUMBERING MACHINE.
No. 542,358. Patented July 9, 1895.
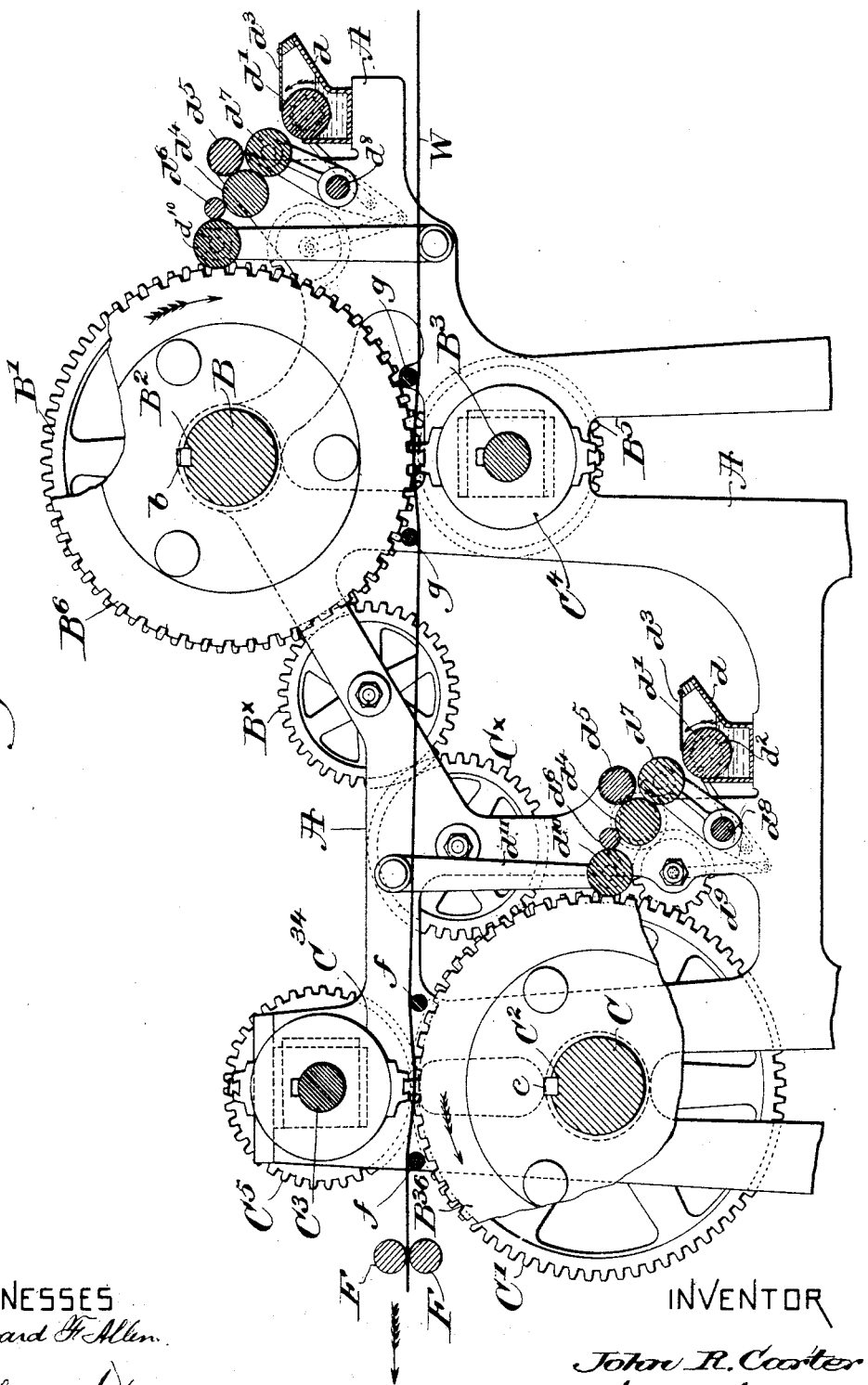
WITNESSES
Edward F. Allen
Thomas Drummond
INVENTOR
John R. Carter
by Crosby & Gregory
attys

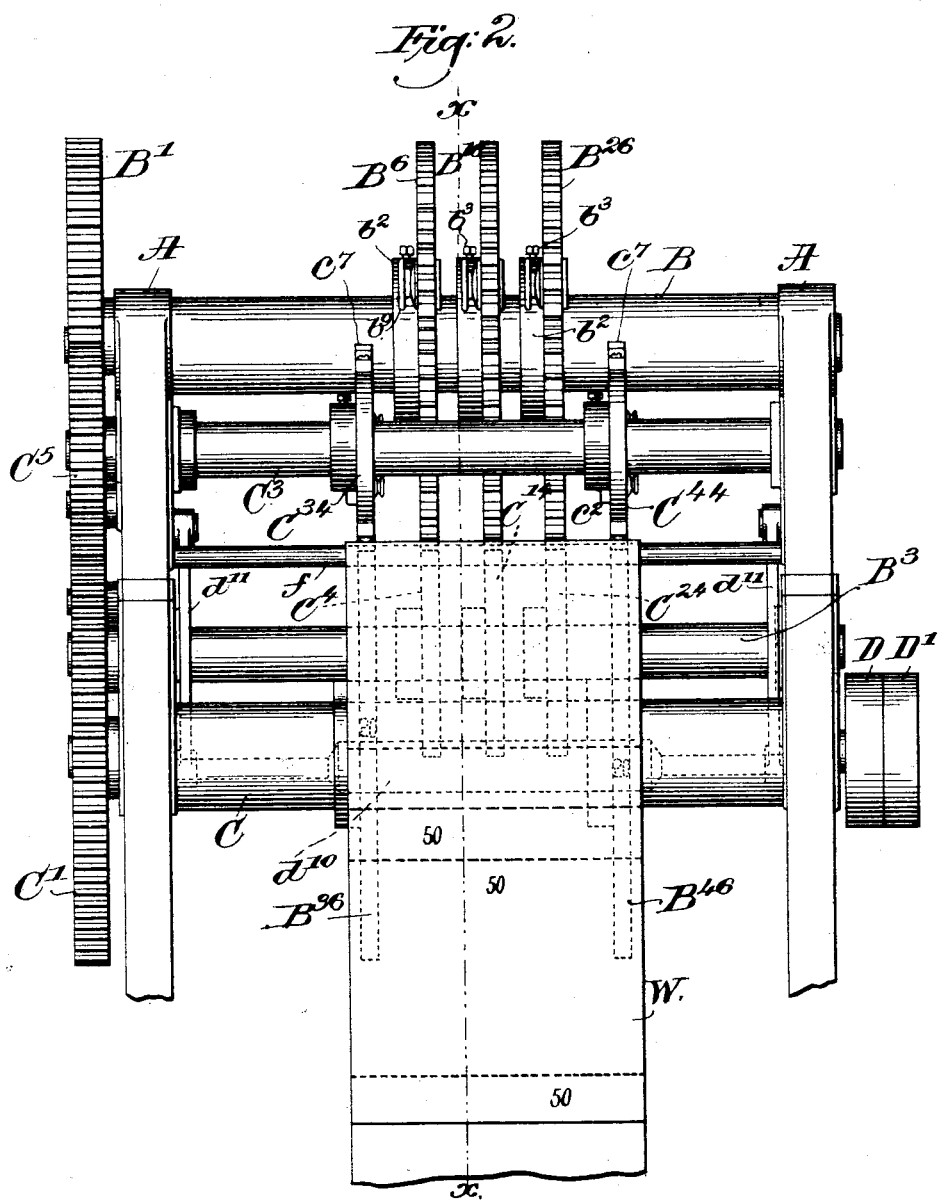

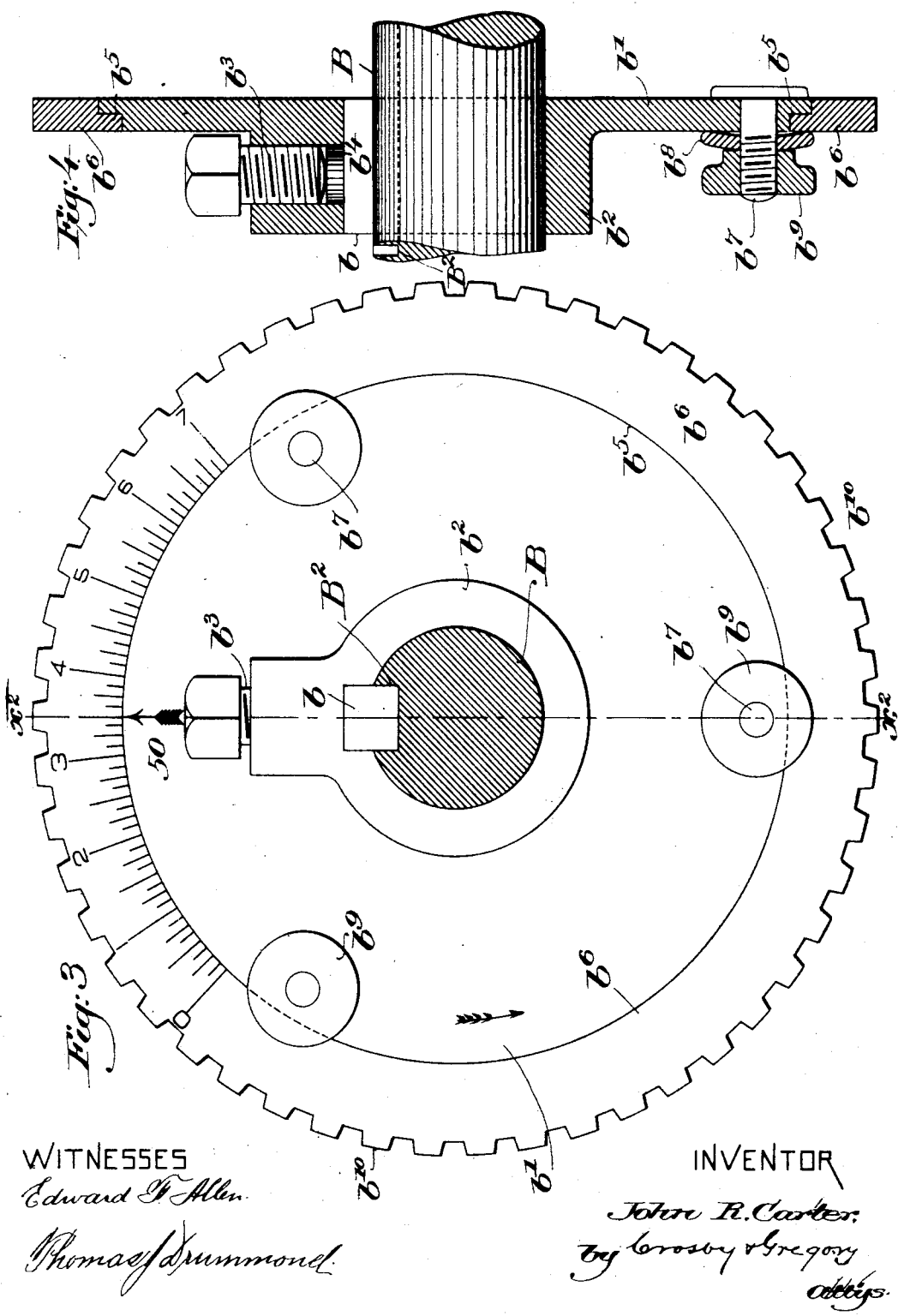

(No Model.)  6 Sheets—Sheet 4.
J. R. CARTER.
NUMBERING MACHINE.
No. 542,358. Patented July 9, 1895.
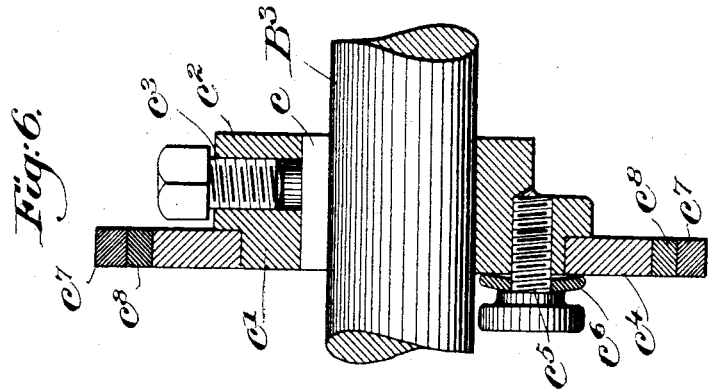
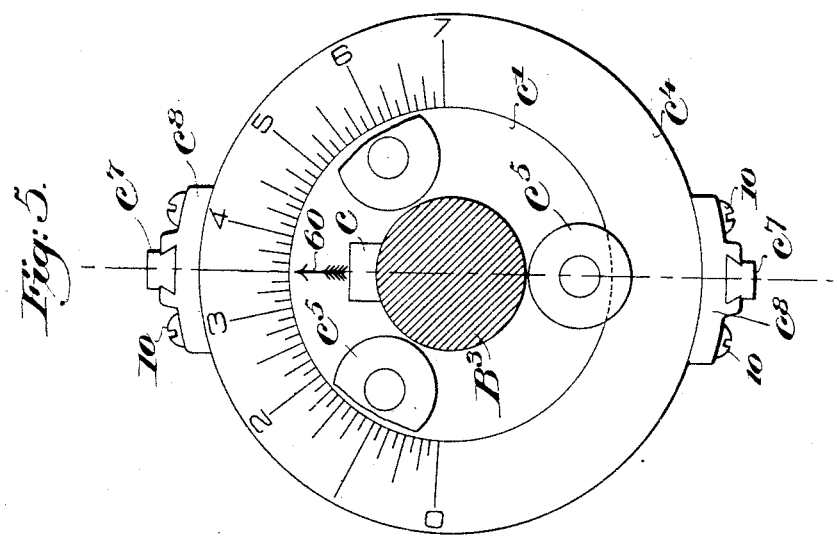
WITNESSES
Edward F Allen.
Thomas J Drummond
INVENTOR
John R. Carter.
by Crosby & Gregory
attys (No Model.) 6 Sheets—Sheet 5.
J. R. CARTER.
NUMBERING MACHINE.
No. 542,358. Patented July 9, 1895.
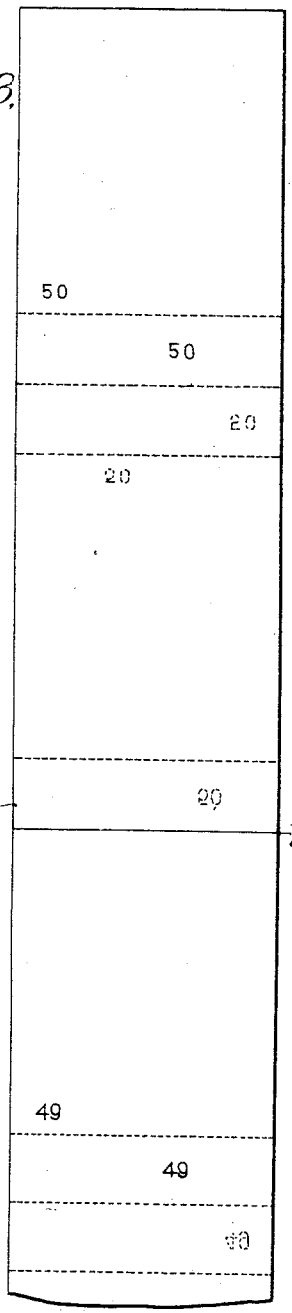
WITNESSES
Edward F. Allen
Thomas J. Drummond
INVENTOR
John R. Carter.
by Crosby & Gregory
attys.

(No Model.) 6 Sheets—Sheet 6.
J. R. CARTER.
NUMBERING MACHINE.
No. 542,358. Patented July 9, 1895.
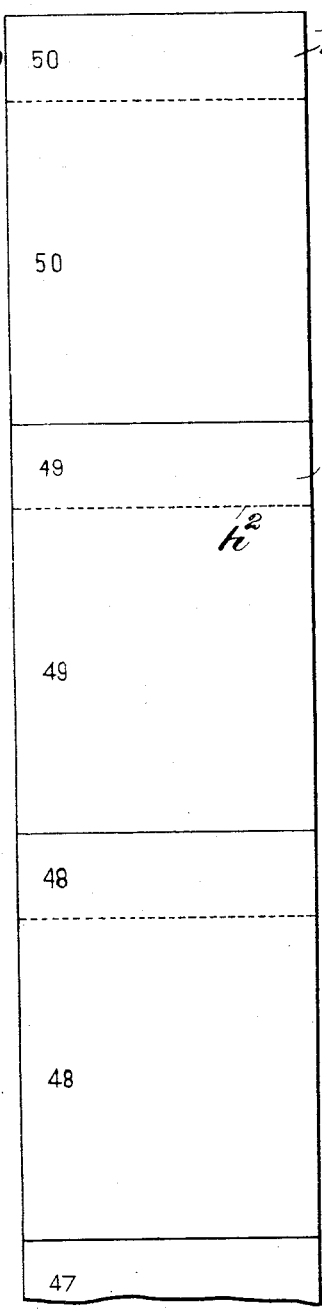
WITNESSES
Edward F. Allen
Thomas J. Drummond
INVENTOR
John R. Carter
by Crosby & Gregory
attys.

UNITED STATES PATENT OFFICE.

JOHN R. CARTER, OF BOSTON, MASSACHUSETTS, ASSIGNOR TO THE CARTER-CRUME COMPANY, OF NIAGARA FALLS, NEW YORK.

NUMBERING-MACHINE.

SPECIFICATION forming part of Letters Patent No. 542,358, dated July 9, 1895.

Application filed September 17, 1894. Serial No. 523,188. (No model.)

*To all whom it may concern:*

Be it known that I, JOHN R. CARTER, of Boston, county of Suffolk, State of Massachusetts, have invented an Improvement in Numbering-Machines, of which the following description, in connection with the accompanying drawings, is a specification, like letters and figures on the drawings representing like parts.

This invention has for its object the production of an apparatus for impressing upon a preferably-continuous strip or web of paper a certain series of characters or figures at predetermined intervals in a regular sequence, depending upon the scope of the apparatus, and to automatically repeat such series of characters indefinitely without additional care or attention on the part of the attendant.

The well-known sales-book or bundle check-book in very general use in stores is one article for the consecutive numbering of the pages of which my apparatus hereinafter described is particularly adapted. Such checks are subdivided by lines into parts or sections, which are separated by the salesman, who sends one section with the money to the cashier, while the other goes with the goods to the bundle-counter. As a general thing, the part sent to the cashier comprises also a detachable cashier's coupon or voucher, and each salesman has a book or package containing a certain number of checks, usually fifty, numbered from one up to fifty. Each section or part of every check has the same number printed thereon, and it is very desirable that the several numbers be so located upon the sections as to be out of the way of any printed matter or entry to be made thereon, the location depending upon the character of the particular check. By my invention I am enabled to print the numbers upon such checks at any desired points by means of a simple and rapidly-operating apparatus having a wide range of adjustment, and for the sake of convenience in illustration I have shown herein the apparatus as adapted to print a consecutive series of numbers from one to fifty, inclusive.

Figure 1 is a longitudinal sectional view of a numbering-machine embodying my invention, taken on the line $xx$, Fig. 2. Fig. 2 is an elevation of the delivery end of the apparatus shown in Fig. 1 with the feed-rolls omitted, a portion of the web being shown as turned over at right angles to the direction of feed for a purpose to be described. Fig. 3 is a side elevation, on an enlarged scale, of one of the rotatable character-carriers or printing-wheels, the supporting-shaft being shown in section. Fig. 4 is a vertical section thereof on the line $x^2$. Figs. 5 and 6 are side and sectional views, respectively, of one of the rotary platen-carriers with a series of platens secured thereto. Fig. 7 represents the circumference of one of the character-carriers or printing-wheels extended and in five sections, to save space, a series of numbers from one to fifty being shown thereon in their relative arrangement. Fig. 8 is a view of a sufficient portion of a web or strip to show the manner in which the numbers are printed thereon for a series of checks, it being supposed that the strip of paper has been passed through the machine in such manner that the consecutive numbers increase. Fig. 9 is a view similar to Fig. 7 of a modified arrangement of numbers on a printing-wheel to be described, and Fig. 10 is a view of a part of a modified form of check numbered by the arrangement on the printing-wheel shown in Fig. 9.

Referring to Figs. 1 and 2, the operating parts of the apparatus are mounted upon a frame A of suitable shape and provided with bearings for the rotating parts to be described. Shafts B and C are mounted at opposite ends of the frame A and respectively above and below the path of movement of the strip or web W, upon which the characters or numbers are to be printed or impressed, one of said shafts, as C, having usual fast and loose pulleys D D' thereon to be driven by a suitable belt. (Not shown.) Gears B' and C' of equal size are secured to the shafts in mesh with two like intermeshing gears $B^\times$ and $C^\times$ to rotate the shafts B and C in opposite directions and at the same surface speed, the intermediate gears being mounted on suitable studs secured to the frame. Each shaft is preferably provided with a keyway, as $B^2 C^2$, respectively, to receive suitable keys $b$ and $c$, whereby the character-carriers or printing-wheels are secured to and rotate with their respective shafts. As shown in Fig. 2, the shaft B has three of such carriers thereon $B^6$ $B^{16}$ $B^{26}$, while the shaft C has only two $B^{36}$ $B^{46}$, (shown in dotted lines,) such arrangement providing for the imprinting of three numbers or characters upon the upper side of the web and two upon the opposite side thereof.

Mounted in the frame A below and above the path of the web, respectively, are rotatable shafts $B^3$ and $C^3$, to which platen-carriers $C^4$ $C^{14}$, &c., one to co-operate with each type-carrier, are detachably and adjustably secured.

Gears $B^5$ and $C^5$ on the shafts $B^3$ and $C^3$ are in mesh with the gears B' C' (see Fig. 1) to be rotated thereby at a given relative rate of speed, so that the platens to be described, supported on the platen-carriers, are brought into printing position at the proper times and moved past such position in unison with the character-carrier.

Referring to Figs. 3 and 4, one of the printing-wheels or character-carriers is shown enlarged, and as all are alike only one will be described in detail.

A disk $b'$ has a hub $b^2$ with, as herein shown, a keyway therethrough to receive a key $b$ and an intersecting threaded opening to receive a clamping device, (shown as a set-screw $b^3$,) the inner end of which preferably presses upon a washer $b^4$ on the top of the key to firmly hold the latter in its place in the shaft B. The periphery of the disk is shouldered at $b^5$ to receive thereon a flat annular plate $b^6$, retained in place on the disk by a series of threaded studs $b^7$ near its periphery to receive thereon spring-like washers $b^8$ resting on the disk and annulus and kept in place by thumb-nuts $b^9$, loosening of the latter permitting the annulus $b^6$ to be turned round the disk $b'$ for a purpose to be described. A series of numbers from one to fifty, as herein illustrated, are formed upon or rigidly secured to the periphery of the annulus in a certain order, the successive numbers being non-adjacent and a certain number of spaces apart, the notches or teeth $b^{10}$ on the annulus $b^6$ (shown in Fig. 3) representing in an exaggerated manner the said numbers in side elevation, the printing-faces of the numbers all moving in one and the same circular path.

If the uppermost projection $b^{10}$ in Fig. 3 be taken as the initial or starting point, or for the number 1, the number 2 would be on the fourteenth tooth to the right or left, according to the direction in which the type-carrier is to be rotated, the number 3 on the twenty-seventh tooth, counting from number 1, number 4 on the fortieth tooth, and so on, the adjacent numbers being shown in Fig. 7, though for the sake of convenience in reading the said numbers are shown correctly, it being understood that on the printing-wheel or carrier the numbers would be reversed, as are ordinary printing-types.

The successive numbers may be arranged in other ways, as, for instance, on every eighth space or projection, counting the two successive numbers in each set of eight teeth, or on every fourth, counting in both of the consecutive numbers each time, as before.

It is to be remembered that the printing-wheels are continuously rotated, and that at each impression upon the web only one number is printed, the numbers following each other in regular sequence, so it is necessary that the platen must be moved to bring the paper against only one number at a time and at the proper instant. This is herein accomplished by the rotary platen-carriers to be described, which bring the separated platens thereon into position at the proper time to cause the impression of the type on the paper, and as the web is preferably moving forward at a regular rate of speed the movements of the platen and printing-wheel are in unison therewith and in the same direction as the impression is effected, so that the web will not be torn or retarded.

The distance between any two successive but non-adjacent numbers on the printing-wheel is regulated by the circumferential length thereof, and also by the intervening adjacent numbers between the two successive numbers, and by this means the distance on the web between one number and the next in sequence is provided for.

No matter which one of the arrangements hereinbefore described is employed the successive numbers will be printed in sequence, and when a complete series has been printed the continued rotation of the printing-wheel will automatically cause the first number of the series to be again printed at the proper distance from the last number of the series just completed so long as the apparatus is in operation.

One of platen-carriers is shown in detail in Figs. 5 and 6, in general arrangement being very similar to the character or type carrier described, a description of one platen-carrier sufficing for all of the others.

The shaft $B^3$ or $C^3$ has secured thereto, preferably by a key $c$, a shouldered disk $c'$, having a clamping-screw $c^3$ in its hub $c^2$ to hold the key in place, and an annular plate $c^4$ is held on the disk by clamp-screws $c^5$, bearing upon washers $c^6$ overlapping the disk and plate, tightening of said screws preventing the plate from moving relatively to the disk $c'$, two of the screws $c^5$ in Fig. 5 being broken out.

One or more platens $c^7$, preferably of rubber or other suitable material, are mounted in holders $c^8$, secured to the periphery of the plate $c^4$ in suitable manner, as by screws 10, two of such platens being shown on the carriers to correspond with and properly co-operate with the particular arrangement of the numbers on the printing-wheel, the size of the platen being such that only one number at a time can be printed upon the paper resting thereon.

Each printing-wheel, or set of printing-wheels, as the case may be, has an inking mechanism of suitable construction adjacent thereto to ink the numbers before the impression is made, and one form of inking mechanism is shown in Fig. 1 in section.

A trough $d$ has mounted therein a collecting-roller $d'$, rotated by a suitable ratchet-wheel $d^2$, (shown in dotted lines, Fig. 1,) the surplus ink being removed from the roller by a scraper $d^3$.

Distributing-rollers $d^4$, $d^5$, and $d^6$ receive ink from the collecting-roller by an intermediate oscillating roller $d^7$, mounted in bearings secured to a rock-shaft $d^8$, receiving its motion from the gear $d^9$ in mesh with the adjacent large gear B' or C', as the case may be. As shown in dotted lines, Fig. 1, the rock-shaft has an arm secured thereto, carrying a pawl which actuates the ratchet-wheel $d^2$, the shaft being rocked by means of a crank-pin on the gear $d^9$, said rocking mechanism forming no part of this invention.

The inking-roller $d^{10}$ is mounted in suitable supports $d^{11}$, secured to the frame A, to contact with the distributing-roller $d^4$ and receive ink therefrom, and also to contact with the periphery of each adjacent character-carrier or printing-wheel.

On referring to Fig. 1 it will be seen that the two inking mechanisms are alike, and therefore need not be further described.

As hereinbefore stated, the apparatus illustrated is adapted to imprint three numbers of the same denomination upon one side of the web and two on the opposite side, all of said numbers, however, coming within the extreme limits or boundaries of the portion of the web, which will form a single check or page to be used in a sales-book after the complete series of numbers have been properly imprinted upon the web of paper. The pages or checks may be severed from the web in any desired manner, forming no part of my invention.

Each of the printing-wheels or number-carriers is secured to its supporting-shaft B or C, as the case may be, independently of the other printing-wheels on the same shaft, by suitable means, one specific form—viz., the slot and key—having been already described, and viewing Fig. 2 it will be seen that the location of a particular number relative to the longitudinal edge of the web W is determined by the distance of its particular printing-wheel from a given point on its supporting-shaft, and that the perpendicular distance between any two numbers of the same denomination when printed is determined by the interval between their respective carriers or wheels. Thus in Fig. 2 the two printing-wheels $B^{36}$ and $B^{46}$ on the shaft C are arranged to print their numbers upon the under side of the web and near its longitudinal edges, while the three wheels $B^6$, $B^{16}$, and $B^{26}$ on the shaft B are arranged to imprint their numbers on the body of the web and nearer its center and on its upper side as it passes through the apparatus.

The successive numbers printed by each carrier or wheel are at equal distance apart, but those printed by separate wheels are at different distances from the ends of any one check-section, as shown in Figs. 2 and 8, and consequently the numbers on the web are at different distances from each other measured in the direction of the length of the web, which direction may be regulated and predetermined, so that the relative position of the several numbers on a given check-section will be the same as on any other section. This is accomplished by adjusting the angular distances between given points on the several printing-wheels or number-carriers on the same shaft, the angular distance between two given numbers of the same denomination on their respective carriers determining the interval between such numbers when printed. This adjustment can be very conveniently made by the construction illustrated in Figs. 3 and 4, wherein I have shown a pointer or index 50 on the disk $b'$ to act in conjunction with a scale on the face of the annulus $b^6$, the common keyway in the shaft B being taken for convenience as the starting-point. The scale on the annulus is preferably so arranged that its divisions represent inches and fractions of an inch measured on the periphery of said annulus, whereby when it is desired to have one carrier or wheel imprint any one of its numbers at a distance of three and one-half inches—for instance, from the corresponding number printed by another carrier—the set-screws $b^9$ would be loosened and the annulus of one carrier moved around until the index 50 pointed to the "$3\frac{1}{2}$" mark on the scale, the index on the other carrier being set at zero. Then, inasmuch as such adjustment is equivalent to a space of three and one-half inches on the periphery of the wheel or carrier, the two corresponding numbers printed by such adjusted carriers would be three and one-half inches apart on the web. Thus the various printing wheels or carriers on any one shaft may be properly set to imprint their numbers on a web at the desired relative intervals, and the wheels or carriers on the two shafts B and C will be set to properly print the numbers upon the top and under side of the web and in their relative places.

It will be obvious that the platen-carriers must also be capable of adjustment on their shafts and relatively to each other in order to properly bring their platens into position to move the web of paper against the proper number on the co-operating printing-wheel at just the right instant, and I have herein shown the means for adjusting the platen-carriers, substantially the same as has been described for the printing-wheels. The disk $c'$ of each platen-carrier has thereon an index 60 to co-operate with a scale on the annular plate $c^4$, the scale-divisions being radial to the center of rotation of the carrier, its divisions corresponding to inches and fractions of an inch measured on the periphery of the co-operating number or character carrier. The circumferential distance between any two platens $c^7$ on one of the platen-carriers is equal to the circumferential distance between two successive but non-adjacent numbers on its co-operating type or printing wheel, so that any platen moving in its circular path eccentric to the printing-wheel will arrive at the printing-point simultaneously with the number that is to be printed at that instant, the supporting-shafts of the platen and number carriers being geared together as described.

In order to keep the web away from the face of the character-carriers, except when momentarily brought into contact therewith by the platen, I have provided guide-rolls, as $f$ and $g$, (see Fig. 1,) arranged in pairs extending across the apparatus, one roll on each side of the printing-point of each set of printing-wheels, it being understood, of course, that the paths of movement of the platens are externally tangent at the printing-point to the circular paths described by the characters or figures, the guide-rolls $f$ being interposed between the web and the adjacent set of character-carriers.

Suitable feed-rolls F are located at the delivery end of the apparatus to be positively driven in any suitable manner, and are shown only in Fig. 1 for the sake of clearness, the said feed-rolls nipping the web W between them and drawing it steadily through the apparatus, the continuous operation of the machine being limited only by the length of the web drawn therethrough, for if any series of successive numbers are fixed upon the number carriers or printing-wheels after the entire series has been printed the machine will automatically begin to print the first number of the series over again, and so on indefinitely.

While in Figs. 2 and 8 the checks or pages are shown as having the numbers printed along the length of the web, it is obvious that they might be printed transversely to said web by properly adjusting the printing-wheels, the numbers thereon being so placed that the base of each number will be parallel to the plane of rotation of the carrier or printing-wheel rather than parallel to its axis of rotation.

In Fig. 8 it is to be understood that the arrangement of the printing-wheels has been changed, and while two numbers are printed upon one side of the web and three upon the other one of the pair prints near one edge, while the other prints near the center of the web, and of the set of three printing-wheels one prints near the other edge of the web and the remaining two toward its center.

The space $h$, Fig. 8, is used as a stub or retaining portion, the checks being severed along the line $h'$.

The dotted lines represent perforations across the web, whereby the parts of each check are readily severed by the salesman or cashier.

In the modification shown in Fig. 10 the form of check is very commonly used in restaurants and the like, a large and a small space on the check having the same number thereon, the small space $h^\times$ being left for a stub and also to receive the total amount of a transaction, while the large space, which is to be detached therefrom along the dotted line $h^2$, receives in detail the particulars of the transaction, such numbering being termed "double numbering," and to form such double numbers I have shown in Fig. 9, on an enlarged scale, the produced periphery in five sections $m$, $m'$, $m^2$, $m^3$, and $m^4$ of a suitable number-carrier or printing-wheel adapted to perform such printing, it being understood that in actual practice the circumferential distance between two numbers of the same denomination on the carrier will be the same as the distance which is to separate such numbers on the check or page section when printed.

One hundred numbers in two sets, each running from one to fifty, inclusive, are shown on the circumference of the printing-wheel, (illustrated in Fig. 9,) and the numbers in said Fig. 9 indicate the relative location, but not the true position, of the various numbers, as it will be of course obvious that to print the numbers correctly upon the web they must be reversely made on the carrier.

While I have herein shown a certain number of character-carriers or printing-wheels and their co-operating platens, my invention is not restricted thereto, either as to the number or relative arrangement thereof, for it will be obvious that but one carrier may be mounted on each shaft, if desired. In any case, however, each character carrier or wheel has its own co-operating platen-carrier and platen or platens. While I have also shown a very desirable construction for both the rotatable printing-wheel or character-carrier and for the platen-carrier, my invention is not restricted thereto, nor is it restricted to securing the said carriers to their respective shafts in just the manner herein shown, as any other well-known form of adjustable connection might be used to perform the same function.

The web may be run through the apparatus at a high or a low rate of speed, depending considerably upon the thickness and strength of the paper composing it, the co-operating parts of the apparatus performing their function equally well at high or low speed.

Instead of a continuous operation of the apparatus the paper may be fed thereto in such manner that the rotation of the printing-wheels will be intermittent, so that one check will be printed, then a pause, then another check, and so on.

Hereinafter in the claims I have designated the arrangement of the series of successive characters or numbers upon the printing-wheels or carriers as "successive" and "non-adjacent," meaning thereby that any two consecutive numbers on the wheels are separated by other numbers of the series.

It will be obvious that a single type-carrier or printing-wheel having a sufficiently broad face could be made to accomplish the work of several arranged side by side, but in that case no relative angular adjustment of the numbers would be possible unless a series of annular plates were mounted on a common disk.

I claim—

1. A revoluble printing wheel having a series of successive figures or characters secured thereto in a non-adjacent manner, or out of regular sequence, as described, and moving in a circular path, and a platen to intermittingly approach the printing point, and to pass by it in unison with the movement of the character being printed, combined with means to rotate said wheel through an arc greater than the distance between two adjacent figures or characters, and equal to the interval between two successive ones, whereby the successive figures or characters are brought into printing position opposite the platen, and thereby printed in regular sequence, and means to actuate the platen, substantially as described.

2. A revoluble printing wheel having a series of successive non-adjacent figures or characters secured thereto and moving in a circular path, whereby the entire series may be printed in regular sequence by rotation of the wheel in the same direction, combined with a platen movable in a path externally tangent at the printing point to the path of the characters, and means to move said wheel and platen, to bring the platen into position at the printing point simultaneously with the character to be printed to cause the figures or characters to be printed singly in their proper sequence, during simultaneous movement of the wheel and platen, substantially as described.

3. A revoluble printing wheel having a series of successive non-adjacent figures or characters secured thereto and moving in a circular path, whereby the entire series will be printed in regular sequence by rotation of the wheel in the same direction prior to the repetition of the first, and inking mechanism for said printing wheel, combined with a plurality of separate platens movable about a common center in a circular path externally tangent at the printing point to the path of the characters secured to said printing wheel, and means to move said wheel and platens to bring the latter one after another into printing position with one after another of the non-adjacent characters or figures on the wheel, to cause the numbers to be printed in their proper sequence, substantially as described.

4. A series of revoluble printing wheels, each having a series of successive non-adjacent figures secured thereto and moving in a circular path, a common axis of rotation for said wheels, and an inking mechanism for the wheels, combined with a series of separate platens each movable toward and away from the printing point of one of said wheels, means to adjust the relative position of said wheels upon their common axis, and to adjust said platens correspondingly, and an actuating mechanism to move the wheels and platens, to bring the latter into position to cause the figures or characters on each wheel to be printed singly in their proper sequence by its co-operating platen, substantially as described.

5. A revoluble shaft, a series of independent printing wheels laterally and rotatably adjustable thereon, each wheel having a series of successive figures or characters secured thereto in a non-adjacent manner, or out of regular sequence, as described, and moving in a circular path and a series of separate platens laterally and rotatably adjustable on a common support, and movable toward and away from the printing point of their co-operating printing wheels, combined with means to rotate said wheels in the same direction and to move the platens in paths externally tangent at the printing point to the paths of the figures or characters, whereby the consecutive figures or characters on each wheel are caused to approach their respective platens in regular sequence, to be so printed, the intervals between the printed figures or characters in two or more sets being regulated by the adjustment of the printing wheels, substantially as described.

6. In an apparatus for printing series of figures or characters in regular sequence upon opposite sides of a continuous web, a revoluble printing wheel located at each side of the path of the web, each wheel having rigidly secured upon its periphery a series of successive non-adjacent figures or characters, a platen to intermittingly co-operate with each printing wheel, and of sufficient width to act upon but one character at a time, and guide rolls adjacent each wheel and between it and the web, combined with feed rolls for the web, and means to move said printing wheels and their platens, to bring the latter into position to press the web against one figure after another fixed on the wheel and to move past the printing point in unison with the figure being printed, to thereby cause them to be printed singly in their proper sequence, substantially as described.

In testimony whereof I have signed my name to this specification in the presence of two subscribing witnesses.

JOHN R. CARTER.

Witnesses:
M. L. WARMETH,
BRONTE M. AIKINS.